United States Patent
Friedman et al.

(10) Patent No.: US 10,130,884 B1
(45) Date of Patent: Nov. 20, 2018

(54) SYNCHRONIZED MULTIMEDIA CONTENT FOR GAMING MACHINES

(75) Inventors: Stacy A. Friedman, Beaverton, OR (US); Jon H. Muskin, Philadelphia, PA (US)

(73) Assignee: Olympian Gaming LLC, Lake Oswego, OR (US)

( * ) Notice: Subject to any disclaimer, the term of this patent is extended or adjusted under 35 U.S.C. 154(b) by 386 days.

(21) Appl. No.: 13/080,160

(22) Filed: Apr. 5, 2011

Related U.S. Application Data

(60) Provisional application No. 61/321,111, filed on Apr. 5, 2010.

(51) Int. Cl.
*A63F 13/00* (2014.01)
*A63F 13/50* (2014.01)

(52) U.S. Cl.
CPC .................. *A63F 13/50* (2014.09)

(58) Field of Classification Search
CPC ....................................................... G07F 17/32
USPC .......... 463/20, 42, 7, 16, 21, 25, 31, 39, 43; 273/138.1, 139, 141 R, 142 R, 142 H
See application file for complete search history.

(56) References Cited

U.S. PATENT DOCUMENTS

| | | | | |
|---|---|---|---|---|
| 7,758,427 | B2 * | 7/2010 | Egozy | 463/42 |
| 2003/0100359 | A1 * | 5/2003 | Loose | G07F 17/32 463/20 |
| 2005/0043090 | A1 * | 2/2005 | Pryzby | G07F 17/32 463/35 |
| 2006/0009285 | A1 * | 1/2006 | Pryzby et al. | 463/30 |
| 2008/0214289 | A1 * | 9/2008 | Pryzby et al. | 463/25 |
| 2009/0298579 | A1 * | 12/2009 | Radek | G07F 17/32 463/25 |
| 2010/0234091 | A1 * | 9/2010 | Baerlocher et al. | 463/20 |
| 2011/0130192 | A1 * | 6/2011 | Englman | G07F 17/32 463/20 |

\* cited by examiner

*Primary Examiner* — Tramar Harper
*Assistant Examiner* — Jeffrey Wong
(74) *Attorney, Agent, or Firm* — Muskin and Farmer LLC

(57) ABSTRACT

A network of slot machines which plays audio and/or other media assets in synchronicity, leading to a more consonant audiovisual atmosphere or more effective player attraction. Audio may be dynamically distributed among different gaming machines in the network. Audio playback may be synchronized between several machines, forming a collaborative harmony. Game events, such as reels stopping, may be synchronized with audio playback.

20 Claims, 6 Drawing Sheets

SYNCHRONIZED MULTIMEDIA CONTENT FOR GAMING MACHINES

CROSS REFERENCE TO RELATED APPLICATIONS

This application claims benefit to U.S. provisional application 61/321,111, filed Apr. 5, 2010, entitled "Synchronized Multimedia Content for Gaming Machines" and that application is incorporated by reference in its entirety for all purposes.

BACKGROUND OF THE INVENTION

Field of the Invention

The present general inventive concept is directed to a method, apparatus, and computer readable storage medium for a dynamic gaming machine network of varying size having synchronized multimedia content playable by the gaming machines on the network.

Description of the Related Art

Casinos are noisy environments, and most of that is due to slot machines. Each slot machine is programmed to play sounds when the reels are spinning (reels may be mechanical, physical devices—rotating drums covered with images—or may be virtual, video representations of a reel on a display screen), when the reels come to rest, when an award is won, and when a player cashes out. Some slot machines are even programmed to play sounds during idle periods. In a crowded casino, there can be literally hundreds of distinct sounds occurring at the same time, creating a terrible cacophony. To reduce the impact of this dissonance, slot machine manufacturers typically orchestrate their audio effects in the key of C major. However, when one walks into a busy casino slot floor, the overall sonic effect is still a muddled cacophony, just in the key of C major. This noise is rarely pleasing, and never distinct and consonant.

U.S. Pat. No. 7,355,112 to Laakso (which is incorporated by reference herein in its entirety) teaches a gaming machine which modifies background music according to the player's pace. However, if two such machines are placed side-by-side, and the players play at a different rate, the resulting combination of background music from both machines will be disharmonious and arrhythmic.

Therefore, what is needed is a way to reduce the muddled, non-descript background cacophony in a casino, and to improve the level of entertainment for both gamblers and people passing through a gaming floor.

SUMMARY OF THE INVENTION

It is an aspect of the present invention to provide flexibility and innovations in casino game play. It is a further aspect to provide a more compelling, consonant sonic atmosphere for a casino.

The above aspects can be obtained by a gaming machine network comprising two or more electronic gaming machines and an audio asset, wherein playback of the audio asset is synchronized and distributed dynamically across the two or more electronic gaming machines.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Figure 1:
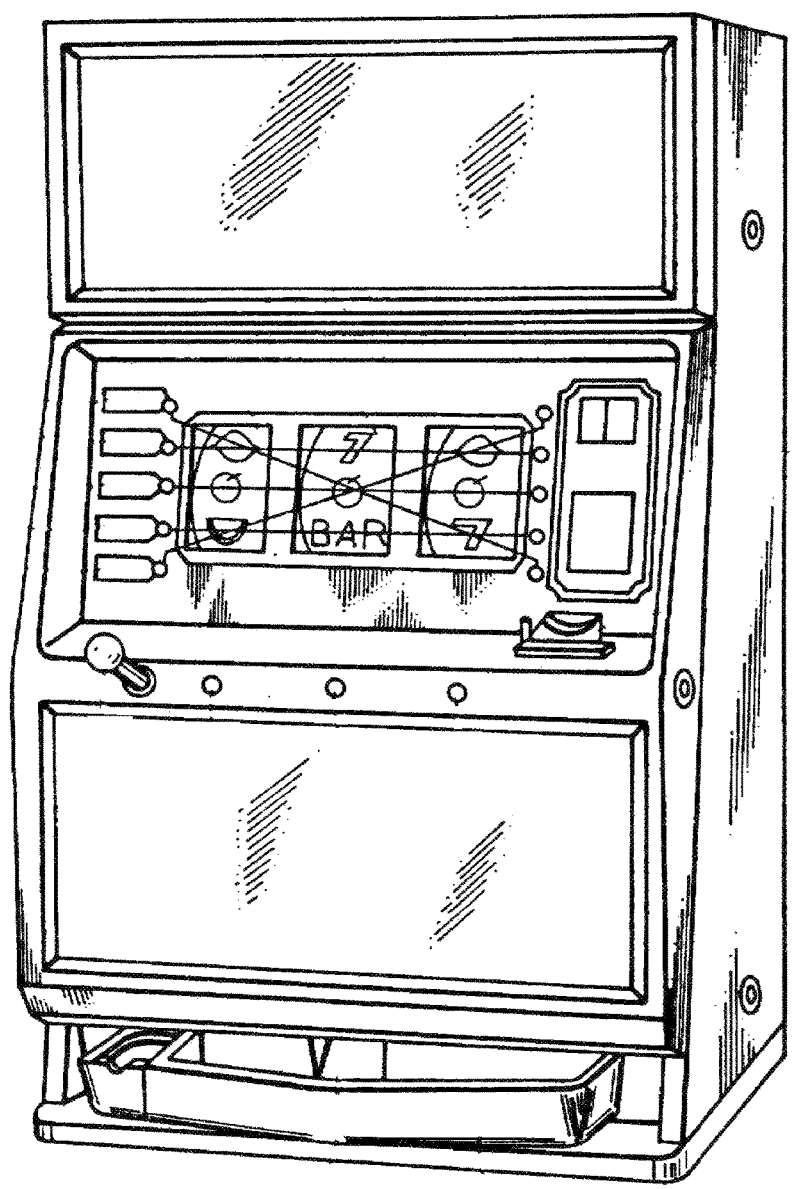
FIG. 1 is a drawing of a slot machine, of the kind that can be used to implement inventive concepts described herein.

Reference will now be made in detail to the presently preferred embodiments of the invention, examples of which are illustrated in the accompanying drawings, wherein like reference numerals refer to like elements throughout.

The present general inventive concept is directed to a method, apparatus, and computer readable storage medium for a gaming machine network of varying size having synchronized multimedia content playable by the gaming machines or other machines on the network. The synchronized multimedia content can be considered a "collaborative harmony," that is participating machines can play different sounds and participate in generating a musically consonant, harmonious sound by following programming instructions.

FIG. 1 is a drawing of a slot machine which can be used to implement the present inventive concepts. While a mechanical machine is shown, a video slot machine (not pictured in FIG. 1) can also be used. Mechanical and video slots can also be mixed to implement the present invention.

Figure 2A:
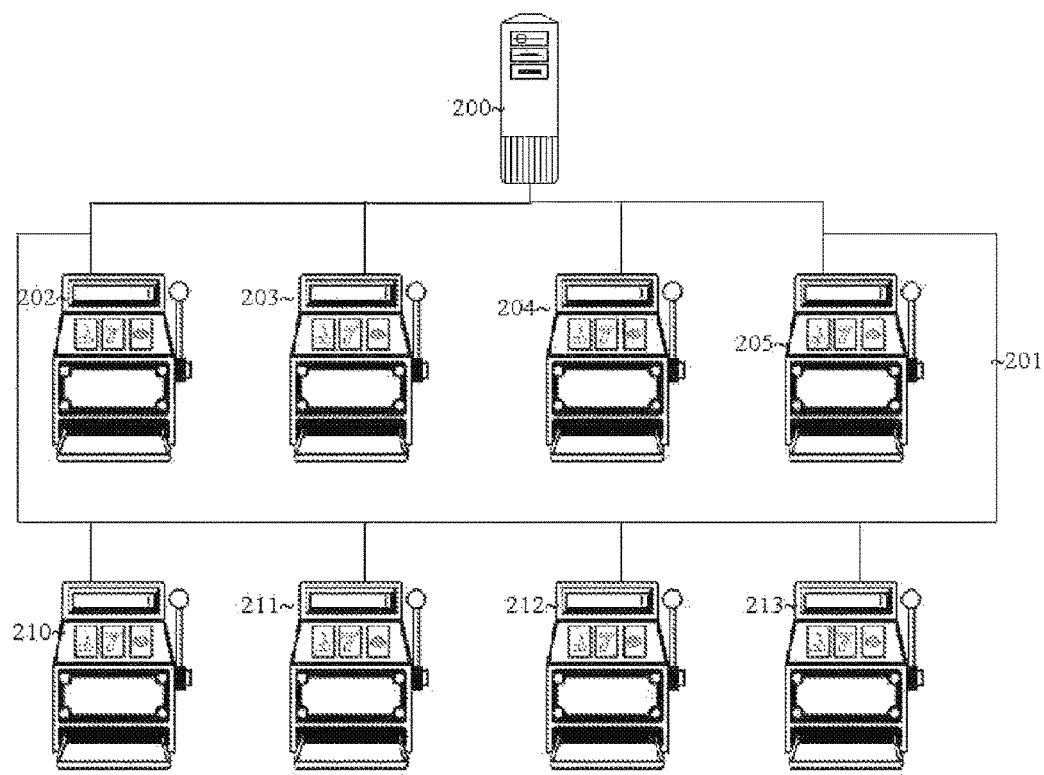
FIG. 2A is a block diagram illustrating multiple rows of networked slot machines, according to an embodiment.

FIG. 2A is a block diagram illustrating multiple rows of networked slot machines, according to an embodiment;

A server 200 can be used to perform the various synchronization operations described herein. The server 200 can be combined with other servers controlling operations of the slot machines (e.g., casino player database, etc.) or it can be an entirely separate server/device.

A network connection (e.g., LAN, WAN, etc.) 201 connects the server 200 with a first row of slot machines 202, 203, 204, 205 and a second row of slot machines 210, 211, 212, 213. Each slot machine comprises its own respective audio processing and playback module (not pictured). Of course other numbers/configurations of slot machines can be used. Preferably, rows/banks of slot machines can be arranged so that players will walk through participating slot machines and be surrounded by the synchronized sounds coming from the machines which would hopefully cause players to become curious enough to start playing an empty slot machine themselves. The arrangement of slot machines in this invention is not limited to rows or lines, as in typical casino fashion, but also areas of a casino floor bounded by multiple machines in any arrangement. Different spatial arrangement of slot machines will lead to different audio environments.

Figure 2B:
FIG. 2B is a block diagram illustrating a peer-to-peer network containing at least two slot machines.

FIG. 2B is a block diagram of an exemplary slot machine network containing two machines. EGMs 252 and 254 are connected by network 256 and can send and receive information over the network. Within each EGM (or alternatively, attached thereto) is an audio processing and playback module, respectively 258 and 260.

Figure 3:
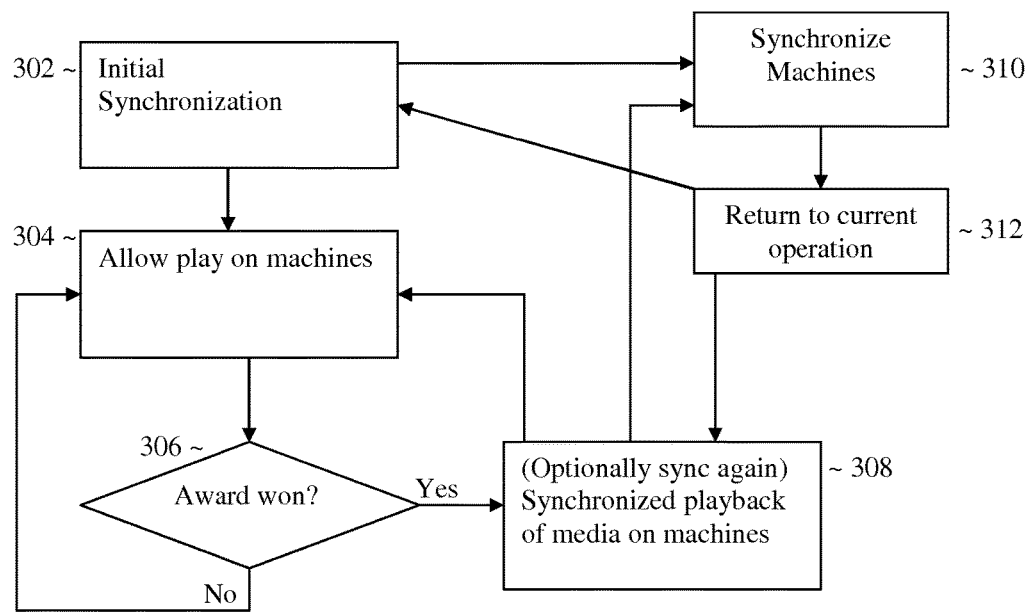
FIG. 3 is a flowchart illustrating an exemplary method of implementing a collaborative harmony, according to an embodiment.

FIG. 3 is a flowchart of an exemplary method for implementing a collaborative harmony using the network of either FIG. 2A or FIG. 2B. FIG. 3 applies to any participating machines, that is, machines which are participating in the networked synchronization as described herein. Not all machines in the casino are required to participate and in fact it is contemplated that only machines in a portion of the casino will participate, although of course the casino manager can pick and choose any combination of machines in the casino for participation. Additionally, non-gaming machines may also form part of the network—for example, a subwoofer or other speaker, a lighting display, a visual display, a spotlight, etc.

In an initial step 302, participating machines may be synchronized by any of several methods, including those which may be known in the art, including MPEG media synchronization using PCR timing signals. Ishibashi and Tasaka describe that media synchronization may be controlled by a centralized or distributed scheme; in the abstract of their paper "Causality and media synchronization control for networked multimedia games: centralized versus distributed", Proceedings of the $2^{nd}$ workshop on Network and system support for games, p. 42-51, May 22-23, 2003, Redwood City, Calif., they write:

> This paper makes a performance comparison between a centralized control scheme and a distributed control scheme; these two schemes were previously proposed by the authors so as to preserve causality and media synchronization for networked multimedia games. In the centralized control scheme, we have a single server which carries out causality control and multiple clients which exerts media synchronization control. In the distributed control scheme, each client performs causality and media synchronization control without any server. For the performance comparison, we have carried out an experiment of a networked shooting game in which computer data, voice, and video are dealt with together.

Further, Blakowski and Steinmetz describe several models for media synchronization ("A Media Synchronization Survey: Reference Model, Specification, and Case Studies", IEEE Journal on Selected Areas in Communications, Vol. 14, No. 1, January 1996). The contents of the Blakowski article is incorporated by reference in its entirety. For example, in one method of the current invention, one machine serves as the timekeeper for the gaming network and regularly broadcasts a "current-time" signal over the network. The current-time signal may be derived from a specific timing program or may be derived from a clock managed by the operating system. To ensure network reliability, a second-in-line failover machine may take over if the timekeeper machine fails to transmit a signal (because, for example, it is offline). Upon receipt of the time signal, each other machine on the network will make any adjustments to its system clock or timing device, thereby ensuring that the machines are synchronized. To improve accuracy, the machines on the network may also be in regular bi-directional communication to continually measure latency between machines, and this latency may be accounted for in the timing synchronization. This can be considered similar to musicians in an orchestra keeping time by watching the conductor's baton while simultaneously listening to their neighbors. Each musician is responsible for listening to the musicians around him or her, as well as watching the conductor, to ensure that he or she is playing in time with the rest of the orchestra. Regardless of the method used, after the synchronization has occurred in operations 310 and 312, each machine on the network is similarly "playing in time" with the rest of the machines. Additionally, the initial synchronization operation 302 may be used to synchronize a new machine when it is powered on and added to the network. Thus, it is not necessary to re-synchronize every machine on the network when new machine is added. However, these are only examples of a synchronization mechanism, and any known synchronization method may suffice.

Once initial synchronization 302 has completed, the method transitions to operation 304 to permit play on the devices on the network. Synchronization 310 and 312 can—and may sometimes need to—occur during machine play as well. During play, often an award will be won. Operation 306 checks for a winner, and if an award has been won, transitions to operation 308 which (may optionally re-synchronize 310 and 312 and then) orchestrates a synchronized playback of a media asset on the appropriate devices.

There are several different ways that playback of a media asset can be distributed across two or more devices. In the simplest method, the entirety of the media can be played back on all devices simultaneously. This is similar to visiting a television store and seeing the same movie or program playing on a dozen televisions at the same time. This may be effected by embedding the media with a time-code, such as SMPTE time codes or others timing signals as is known in the art. Since the clocks or timing devices of each of the machines on the network have already been (or are currently being) synchronized, playing the media starting at time code X at system time Y across all machines will actually result in simultaneous playback. Of course, this "broadcast" method fails to take into account the interactivity of slot machines, nor that all players do not play at exactly the same time. It wouldn't make any sense for a player who is in the middle of a spin, or who is just sitting and reading the help screens, to suddenly see and hear the "you've just won the jackpot" celebration and music. Therefore, playback must be targeted to the appropriate state of the player's game.

There are several game states in which a gaming machine can be. A machine may be idle or active. A machine is idle when it is not being played at all—either because there is no player, or because the player is not currently playing. An active machine may be in several sub-game states: a machine may be spinning the reels, a machine may be in the process of stopping (resolving) the reels, or a machine may be just finishing the reel resolution and playing any award celebration sounds. A machine may also be "between spins", and still considered active rather than idle. A machine may also be in a bonus round or secondary game feature. Detecting when a machine goes from active to idle can be done as is known in the art. During spinning, a slot machine can be playing reel-spin/background music in time with the timing signal. Also, during reel resolution, that machine can be playing reel-spin or background music in time. Finally, if a gaming machine wins an award, the award music can also be played in time. Thus, game states are frequently associated with audio cues.

Suppose Jill is playing a first gaming machine, and Mike is playing a second gaming machine. Jill and Mike play at different rates—Jill plays faster. When Jill and Mike both press play at roughly the same time, a musical background track consisting of bass drum, snare drum, bass guitar, and cymbal plays on both machines. This musical track is synchronized, not only between the first machine and the second machine, but with the timing signals mentioned previously. Thus, if Jill presses play a half-second before Mike, the first machine will begin playing the musical track before the second machine, but also will begin a half-second earlier in the musical track. For another example, if the musical track was the lyrics "the sun'll come out tomorrow", Jill may press play and hear "come out tomorrow" while Mike may press play ½ second later and hear "out tomorrow", and the words "out tomorrow" would be heard simultaneously from both machines. In this way, both of the machines act like two radios, one being turned on before the other, but both playing the same music when powered on. Alternately, when both machines are both spinning simultaneously, the musical track described above can be distributed between the two machines, so the bass drum and cymbal play on the first machine while the snare drum and bass guitar play on the second machine. (Any such combination of distribution between both machines is possible, such as some sounds being played on all machines, while others are played only on some machines.) If Jill wins an award, the first machine plays award celebration music in time with the reel-spinning sounds being played on the second machine. Similarly, if Mike wins an award later, the second machine plays award celebration music in sync with any music being played on the first machine. The physical location of the machines, relative to each other (or based on an absolute position relative to another object) can influence the distribution of media to each machine on the network. For example, a machine closer to a wall may receive a higher percentage of bass-heavy music, while a machine adjacent to a high-traffic footpath may receive a higher percentage of treble-heavy music, in accordance with overall acoustic design of the casino space or other considerations. As an example, in a setting with multiple machines using a jazz music theme, a certain bank of machines may be visually designated to be the "sax section" while another would be the "trumpet section", and the music distributed to those machines would favor or feature the named instrument, as appropriate.

In an extremely simplified embodiment of the present inventive concept, a "single track" can be activated whenever each machine makes a sound. For example, consider a three second sound clip of the famous four notes of Beethoven's Fifth Symphony. This sound clip can be looped repeatedly on a muted track, and whenever an individual slot machine makes a sound, the track is then unmuted for a duration which is either pre-determined or is computed based on the start time and length of the clip. For example, if the length of the clip were one second and one second was a pre-determined duration, the clip could also play the remainder of the current loop and one more entire repetition. Thus, think of the continuously looping clip as a radio broadcast. Whenever a slot machine is to make a noise (e.g., reels are spun, an award is paid), then that slot machine "turns on" and plays a radio tuned to the broadcast for a short duration as described above. In this way, all participating machines are synchronized and can play an audio clip in unison (in sync).

The "single track" example described in the previous paragraph is operational but overly simplistic. In a further "multi track" embodiment, different machines can have different "track assignments" (e.g., certain machines can play drums, certain machines can play bass, etc.) Gaming machines can optionally display (electronically or on the machine itself such as on the belly glass) which type of machine it is, for example the machine can indicate it plays drums or it plays bass. Typically, the type of sounds the machine emits has no bearing on the player's expected return of the actual wagering game. If there are three different types of machines (e.g., different instruments or types of sounds), then this embodiment can be analogized to three different radios all broadcasting a particular instrument which is part of the same musical symphony. For example, "percussion" slot machines are tuned to the percussion station and play that broadcast when the machine is to play a sound. "bass machines" and "wind machines" can also operate similarly. The combination of all three radio broadcasts combine to play a symphony. In a variation, track assignments to machines are not static, but may be altered either manually or automatically based on various criteria, for example, the number of participating machines in the network (which may also vary), or the events occurring on one or more of the machines in the network. As an example, a player entering a bonus round in a rock'n'roll-themed game may hear his machine perform a guitar solo while the bonus round plays, while the nearby machines provide background accompaniment as described herein.

Of course the radio example above is presented to illustrate the embodiment in general terms, but it is not necessarily how the all embodiments of this invention would operate. In one embodiment, a server (such as server 200) would be streaming the respective audio to each machine, and when each machine is triggered to play audio, then the audio currently streamed to the respective machine would be played to the slot machine's speaker. Alternatively, some or all machines may locally store audio assets for playback (and these audio assets can be permanently stored on a machine or may be delivered over a server-based content-delivery network as is known in the art). When it is time for a particular machine to play audio, then the machine would play its particular clip for a predetermined duration or a computed duration, starting at the appropriate time code offset within the clip (as described herein). For example, in a synchronized system, a music symphony (or any musical sound) would play in a continuous loop. As long as the clocks of the machines on the network have been synchronized, or some other synchronization/timing mechanism is in use, then the time-coded audio can play in synchronization across multiple machines. A "synchronization point" is the elapsed time offset from the beginning of an audio track (usually a looped track, but not necessarily). For example, in a 10 second clip, if the synchronized machines are half-way through the clip, then the synchronization point would be at 5 seconds from the beginning (i.e. 5 seconds offset), and the synchronization point would range between 0 seconds and 10 seconds before resetting to 0 and repeating, and audio assets may be synchronized with this synchronization point by using time-coded information carried in the audio signals or another synchronization mechanism. The synchronization information, whether based on a system clock or other independent timing mechanism, can be broadcast from the server to the individual slot machines continuously, or each machine can determine the synchronization point individually (subject to periodic synchronizations, such as on start-up or more regular timing alignment).

Table I below illustrates an example of a simple implementation of the multi-track concept. The "machine type" row represents a category of sound for the machine (e.g., strings, bass, etc.). The sound track row represents the sound clip number that will be played by the particular machine when sound is activated (which will be played at the synchronization point, that is, aligned with the time code). For example, machine type B will play sound clip 2 starting at the synchronization point for a predetermined period of time (e.g., 2 seconds) when it is time for machine B to play a sound. Each of the machines can store their respective assets (or all assets in case machines will switch roles) locally. Assets (clips) can be for example, audio files (stored as MP3, WAV, MIDI files, etc). It is also noted that audio assets need not be limited to a compressed representation of recorded or simulated audio, but can be generated electronically using techniques known in the art of digital synthesized audio (e.g., generate a note at X frequency with Y duration using waveform W) as well as empty time between notes.

TABLE I

| Machine type | A | B | C |
|---|---|---|---|
| Sound clip | 1 | 2 | 3 |

The multi clip embodiment described above is still limited in that each machine is limited to making one sound. In a further embodiment, a "multi-clip multi sound" embodiment can be implemented. This is similar to the multi-clip embodiment described above, but each slot machine is also capable of playing different sounds depending on the state of the machine (idle, reels spinning, paying award, cashing out, bonus round, etc.) When an award is being paid by a machine, the sound should typically be more emphatic than a reel spin sound (which may happen each spin). Thus, each machine can have different sounds that are consistent with the overall collaborative harmony being played in the casino by participating machines. For example, a reel spin sound can be a soft tambourine beating in time with the collaborative harmony, while the award sound can be a loud bass drum beating in the same time as the collaborative harmony. In this manner, different machine sounds enhance the player's experience while contributing to and providing variety to the collaborative harmony.

Table II below illustrates an example of how a multi clip multi sound embodiment can be implemented, for three types of machines.

TABLE II

| Machine type | A | B | C |
|---|---|---|---|
| Reel spin clip | 1 | 2 | 3 |
| Pay Award clip | 4 | 5 | 6 |

Thus, for example, if machine C is to pay an award, then machine C plays sound clip 6 using the synchronization point. The clips can be addressed in numerous ways, for example, if the synchronization point is 2.5 seconds, then clip C can be played for a predetermined amount of time (e.g., n seconds) starting at an offset of 2.5 seconds into the clip. Other ways to address clips and tie them to synchronization points can be used as well. For example, the synchronization point may be multiplied by a constant factor (other than 1) or a positive or negative time duration may be added to the synchronization point to determine the start point in the clip for the machine in question. Moreover, the synchronization point may be dynamically computed using properties of the sound clip/audio asset itself, the spatial location of the slot machine, or a combination. For example, the acoustic design of the environment may be taken into account to adjust the synchronization point to achieve a desired effect, such as reducing (or even increasing) an echo. In an alternate embodiment, the synchronization point would remain unaltered but the time codes embedded into the assets themselves would be altered based on similar factors (e.g. spatial location, type of asset, acoustic design, or others as described herein). This time-code alteration may be manually performed or may also be computed dynamically based on these factors (e.g. an audio asset delivered to a far-away machine would have its time code adjusted automatically to allow apparent aural synchronization with a particular listening location in the environment).

Generally, if a first machine starts playing a first audio asset at time S1, and a second machine starts playing a second audio asset at time S2, the second machine should start playing its asset at an offset of (S2−S1) modulo X (X being the clip length) into the second asset so as to line up with the first one. The offset may be approximate and can be adjusted as needed to account for such spatial considerations or other acoustic issues. The critical factor is that the offset is not zero—that is, the clip played by the second machine does not start being played at the beginning, but at some point in the middle of the clip so it lines up acoustically with the playback of the first clip—except when S2−S1 is actually some multiple of the clip length to begin with (and therefore, the modulus is zero). In other words, the when a new machine starts playing audio, that audio "joins in" with the rest of the audio already being played so the audio is synchronized (just like singers do when they "join in" with others already singing—a new singer doesn't simply start at the beginning; they join in at the appropriate point or offset into the song.) For example, if machine A starts playing its clip at time S1, and the clip is 3 seconds long, and machine B is to start playing its clip at S1+6 seconds, the offset into machine B's clip would be zero (because machine B is starting two full clip-lengths after machine A). But if machine B was to start playing its clip at S1+7 seconds, the offset would be 1 second instead. 1 second is derived from the difference in start times (7 seconds) modulo the clip duration (3 seconds): 7 modulo 3=1. Of course, the playback of machine A's clip at time S1 may not be at the beginning of that clip either, and thus there can be an offset based on the overall synchronization beat or timing signal both for when machine A and machine B start playing their respective audio, such that the audio from machine A and B are not only synchronized with each other but with the timing signal which also controls synchronization overall. For example, machine A may start playing its clip two beats into it, while machine B, triggered three beats later, may start playing its clip five beats in.

Additionally, the network may be enhanced by audio speakers or other media playback devices which are not part of any slot machine, but which nevertheless play back media assets in synchronicity with the rest of the network. For example, a subwoofer may be located in a central portion of a bank of slot machines, and may be playing a bass soundtrack at all times (or based on the level of activity at the gaming machines on the network). An audio clip sent to this subwoofer may still be considered to be synchronized, even if (as above) the time-code for the asset synchronization is adjusted to compensate for the low frequency of the asset and/or the spatial location of the speaker; e.g. a speaker which is far away from a slot machine should start playing a synchronized sound "early" in order to effect an "in-time" feel for the listener. For another example, an external visual display can play back video assets time-synchronized with the audio tracks when a particular game feature occurs such as a bonus round on a particular machine in a bank of machines, while a spotlight on the ceiling is activated and directed toward the particular machine.

Instead of using a single clip for each machine for each sound in the multi clip multi sound embodiment, different assets may be concatenated and played back based on the synchronization point. This can be considered a synchronization point dependent multi clip multi sound embodiment. Table III illustrates the synchronization point dependent multi clip multi sound embodiment. It is noted that the synchronization point repeats every 4 seconds, in other words, the collaborative harmony that is played lasts 4 seconds. Of course, more than three machine types can be used, as well as more machine states.

TABLE III

| Synchronization point (seconds) | [0 . . . 1) | | | [1 . . . 2) | | | [2 . . . 3) | | | [3 . . . 4) | | |
|---|---|---|---|---|---|---|---|---|---|---|---|---|
| Machine Type | A | B | C | A | B | C | A | B | C | A | B | C |
| Reel spin clip | 1 | 2 | 3 | 4 | 5 | 6 | 7 | 8 | 9 | 10 | 11 | 12 |
| Pay award clip | 13 | 14 | 15 | 16 | 17 | 18 | 19 | 20 | 21 | 22 | 23 | 24 |
| Idle clip | 25 | 26 | 27 | 28 | 29 | 30 | 31 | 32 | 33 | 34 | 35 | 36 |

Table III can be read as follows. The three machine types can represent bass (A), guitar (B), and percussion (C). The synchronization point starts is measured in seconds and starts at 0, ends at 4, then repeats. Each machine will play the appropriate event sound according to the current synchronization point. For example, during the first second of the audio loop (from 0 to 1 seconds), if machine B happens to initiate a reel spin, then machine B will play clip 2. As above, the reel spin audio may be required to last for a predetermined duration, e.g. 2 seconds. In this embodiment, then, it is possible for the overall audio playback to extend past the available remaining media in a single clip. For example, if the reel-spin audio is initiated at synchronization point 0.5 seconds for 2 seconds total, clip 2 would begin playing at 0.5 seconds for its remaining 0.5 seconds and end (since there is no more of clip 2). Since the reel-spin audio should continue for an additional 1.5 seconds, several things can happen: 1) the next clip can play (and the one after, etc) until the predetermined total duration is reached. According to table III, this would comprise clip 8 for 1.0 seconds and then clip 14 for 0.5 seconds. Or, 2) the original clip may be looped for the predetermined period duration (e.g. play clip 2 again for 1.0 seconds and a third time for 0.5 seconds). Alternately, the length of the clip may override the desired playback duration; e.g. clip 2 would play for 0.5 seconds whereupon additional audio would not be played for the remaining 1.5 seconds.

Clips can be played either of two ways. In a first embodiment, clips can be played from their beginning and play until either the end of the respective clip, or they can play for a predetermined time. In a second embodiment, clips can be played from a starting point in the clip based on the synchronization point. Thus, for example, if the synchronization point is 2.5 seconds, and each clip is one second in length, then if a machine of type A pays an award, then machine A plays clip 19. However, clip 19 is not played from its start but played based on a mathematical function of the synchronization point. For example, clip 19 can be played starting from the 0.5 second point (e.g., the first half-second of the clip is not played) and clip 19 can be played either: until its completion, or for a predetermined period of time (e.g., 1.0 seconds). If a predetermined period of time extends past the available remaining media in the current clip, the playback may continue as described herein.

It is noted that if the machine state is idle (not being played), then this can be handled in a number of ways. In one embodiment, no sound is played while the machine is idle. In another embodiment, an idle machine can "spring to life" periodically and play a respective audio clip. This can be determined randomly (e.g., every second has a 10% of triggering an idle audio clip). In a further embodiment, an idle clip can play as any other machine state. An idle clip might be silent for a majority of its duration so idle machines are predominantly silent, but the idle clip would still have some sounds to it (to contribute to the collaborative harmony).

In an embodiment of synchronized media playback for gaming machines, it may be useful to synchronize the resolution of the reels in a slot machine game to coincide with the overall soundtrack. For example, a typical 3-reel slot machine may spin for 3 seconds, and take 1 second to fully come to a stop (usually, in left-to-right) order. This is typically done without regard to any other machine or information; instead, the reels simply stop in order, 1, 2, 3, with a short sound being played upon each reel coming to rest. However, these sounds would not typically be in sync with other sounds on other machines. In one embodiment, the rhythm formed by the reels stopping is synchronized with the rhythm of the other machines in the network.

Additionally, when the player wins an award, there may be an award sound to celebrate the payout. In order to synchronize the playback of the award sound with the other machines on the network, it may be necessary to begin playing the multimedia somewhat "in the middle" of a musical section (or musical phrase). While this synchronization will preserve the desired audio atmosphere, it may be musically disconcerting for the player winning the actual award. Using the above example of "the sun'll come out tomorrow", it would be disconcerting to abruptly hear "mout tomorrow" coming from the speakers. Instead of this, it is possible to compress or extend the duration of reel resolution, regardless of when a player actually initiated play, to ensure that the reels resolve in time with the tempo and meter of the desired synchronized multimedia. (e.g. the reels would be delayed such that the audio would play "out tomorrow" or even "tomorrow", rather than coming in during the middle of a word or note.)

As an example, consider that a 5-reel video slot machine may normally spin for 1 second, resolve the first reel, while the other 4 reels spin for an additional 0.5 seconds. Then the $2^{nd}$ reel would resolve while the remaining 3 reels spin, and each additional reel spins for an extra 0.5 seconds. Table IV lists these events:

TABLE IV

| Elapsed Time | Event |
|---|---|
| 0.00 sec | Player presses play; reels begin spinning |
| 1.00 sec | First reel resolves; play first reel resolution sound |
| 1.50 sec | Second reel resolves; play second reel resolution sound |
| 2.00 sec | Third reel resolves; play third reel resolution sound |
| 2.50 sec | Fourth reel resolves; play fourth reel resolution sound |

TABLE IV-continued

| Elapsed Time | Event |
|---|---|
| 3.00 sec | Fifth reel resolves; play fifth reel resolution sound; play any award music |

Alternatively, in Table I, the award music could be played a short time after the fifth reel resolution sound, for example at 3.25 sec. In any event, this rhythm (1 seconds, then every 0.5 sec. thereafter) may not be synchronized perfectly with the meter and beat of the desired synchronized audio track. Suppose the music to be played as an award is at a beat rate of 160 bpm (beats per minute). That translates into one beat every 0.375 sec. In order to ensure that the music is synchronized with the resolution of the slot machine reels, the overall reel spinning time may be reduced by a fraction of a second such that the last reel resolution and/or award music would "line up" with the 160 bpm music being played by the surrounding machines. Also, the resolution time of reels other than the last reel can be modified so they too line up with the beat of the music. For example, if the music is at 140 bpm, the resolution time of each of the reels may be shortened or lengthened accordingly.

Another way to think about this is that there is always a silent background rhythm at a particular tempo going on (the tempo and rhythmic beats synchronized from either the peer-to-peer timing signals or the central timekeeper's synchronization signal(s)), and that when machines are in use, they contribute to the acoustic atmosphere by playing their part of the music in time with the rhythm. A machine that is idle may occasionally play a background part. In addition to idle machines, a machine that is spinning or otherwise in play may play a more meaningful part or portion of the soundtrack. Regardless of when the player initiated the spin, the reel spin duration can be modified to allow the last reel (and other reels) to stop "in time" with the background rhythm, and then the award sounds (if any) can also be played in time with the background rhythm so those sounds coincide with one of the beats of the rhythm (rather than being off the beat, except in the case where syncopation is desired). In this way, a group of slot machines being played, at whatever play rate and by however many players, can nevertheless have their audio output rhythmically synchronized and form a pleasing, consonant musical atmosphere in their immediate vicinity. This beneficially improves the entertainment for the players, whose machines can form a "surround-sound" acoustic experience. E.g. in FIG. 2 (assuming the machines are spatially oriented as depicted), if a player on machine 203 enters a bonus round, the machines 202, 204, 210, 211, and 212 may briefly play one or more audio clips corresponding to this bonus event.

In an alternate embodiment, a multi-track audio broadcast is synchronously received by all gaming machines on the network. This concept is somewhat related to the multi-channel audio which is known in the art, for example stereo has 2 channels (left and right), or surround sound 5.1 has 6 channels. However, known multi-channel audio is not dynamic in that the left stereo signal is hard-wired to the left speaker and always plays there. Further, audio tracks (parts) can be assigned to one or more channels for playback. In one embodiment, each machine in a network of gaming machines will be constantly receiving a multi-track audio signal, of which most or all tracks will usually be muted. Then, dynamically, each machine may un-mute specific tracks in accordance with the state of the gaming machine (or of other machines on the network) as described above. For example, there may be one track for idle machines, three different tracks for reel spinning, and four different award celebration tracks. These tracks are synchronized and are received by the gaming machines continuously, but are not played by the machines' speakers until the appropriate event occurs. If all tracks were allowed to play at once, the full audio or whole song would be heard. Using the example above, when Jill or Mike press "spin" on a slot machine, that slot machine selectively and dynamically un-mutes at least one of the reel-spinning audio tracks for the duration of the spin. Which track, and how many, may be determined randomly, or based on considering how many other machines on the network are currently spinning their reels (or are in other states). If an award is won, the slot machine would un-mute at least one award celebration track.

Further, a timing track or signal, sent along with the multi-track audio, can assist the gaming machines in synchronizing machine events with the audio signal. For example, if a player presses "spin" on the slot machine, the machine can slightly delay the spin of the reels or, as described herein, adjust the cadence of reel resolution to be "in time" with the timing track (and therefore, with the reel-spinning audio track(s)). Further, the spin of the reels can be timed such that, if the player wins, the award celebration track(s) can be un-muted at a musically pleasant time, for example on the beat rather than in the middle of a note or beat. Such synchronization of machine events with audio tracks can be done with entirely local audio, in the case of a standalone machine. While this would not ordinarily solve the problem of a dissonant casino environment, it can still be the case that a player of a remote gaming machine, such as from an online casino, may wish to have a musically pleasant experience. Synchronizing game events with game audio as described herein can accomplish that goal. Moreover, multiple remote games (e.g. two or more online slot machine games played at the same time on a single user's home computer) can have their audio synchronized as described herein, so as to avoid an unpleasant musical environment from the user's computer speakers, such as the unsynchronized overlap of two or more audio tracks.

The gaming machines can also use the timing track, in conjunction with either pre-programmed settings or a dynamic evaluation of the audio tracks currently being played, to adjust when the various un-muted tracks should be muted (turned off) again. As with the initial un-muting, the re-muting of audio tracks should ideally be done in a musically pleasant manner, without cutting off the end of a certain musical passage, for example. This may mean that the gaming machine may either contract or extend its award celebration effects to coincide with an appropriate time to shut off the audio track. Further, the selected reel-spinning track may continue to play along with the award track, and be muted at the end of the award (when, typically, the award track would also be re-muted). Or, in the event that many other players are playing and it would be "too much" reel spinning audio, the reel-spinning track could be muted prior to the un-muting of the award track.

Figure 4:
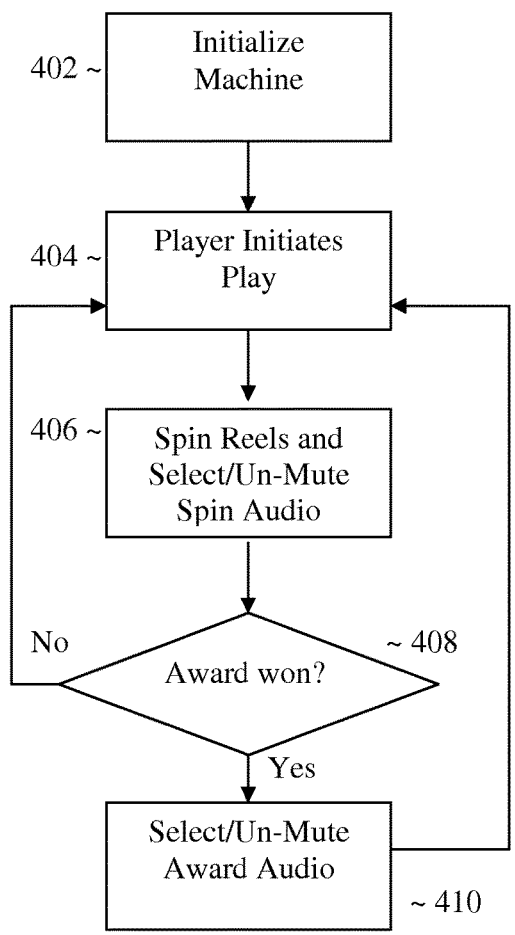
FIG. 4 is a flowchart illustrating an exemplary method of muting and unmuting, according to an embodiment.

FIG. 4 is a flowchart illustrating an exemplary method of muting and unmuting, according to an embodiment. In operation 402, a gaming machine on the network (such as machine 202) is initialized and receives the multi-track audio as described herein. This step includes synchronization with the timing track (or other synchronization mechanism, as needed). Initially, all audio tracks are muted—that is, the machine is not making any noise. After operation 402 is operation 404 wherein the player initiates play. The player is free to do this at any time, of course. After operation 404 is operation 406 where the reels are spun and the reel-spin track is un-muted (or one or more of several reel-spin tracks). As described herein, the timing track is used to influence when, after the player initiates play in 404, the reels begin spinning—and how long it takes each reel to resolve (stop). This should be done in order to synchronize the reel resolution, or at least the overall spinning time of the reels, to produce a musically pleasant playback of the reel spin track and to allow for a musically pleasant start of the award celebration track (if an award was earned on that spin). There may be only one reel spin track, or there may be multiple, and which track(s) should be played may be dynamically determined based on an evaluation of the state of other gaming machines on the network. After the reels stop (at the end of operation 406), the game checks to see if an award was won in operation 408. If not, the game transitions back to operation 404, where the player can initiate play whenever he or she wants. At this point, the reel-spin track has been re-muted and is not heard. Typically, the reel-spin track will be muted after the reels stop spinning, or shortly thereafter as may be necessary for audio-visual synchronization or proper musical phrasing. Optionally, and not shown, if the player chooses not to initiate play for some period of time, or if the machine is otherwise idle, an idle-state audio track can be un-muted by the machine for a period of time. If an award is won in operation 408, the game transitions to operation 410, which un-mutes an award celebration audio track (or one or more of several award tracks). As before, this preferably happens in a musically-synchronized manner, in-time with the timing track and the beat of the other sounds. Also as before, the selection of this award track may be dynamically determined based on the state of other gaming machines on the network. After the award celebration is over, the award track is muted and the game transitions to operation 404. As above, an idle track may be played if the machine becomes idle.

Figure 5:
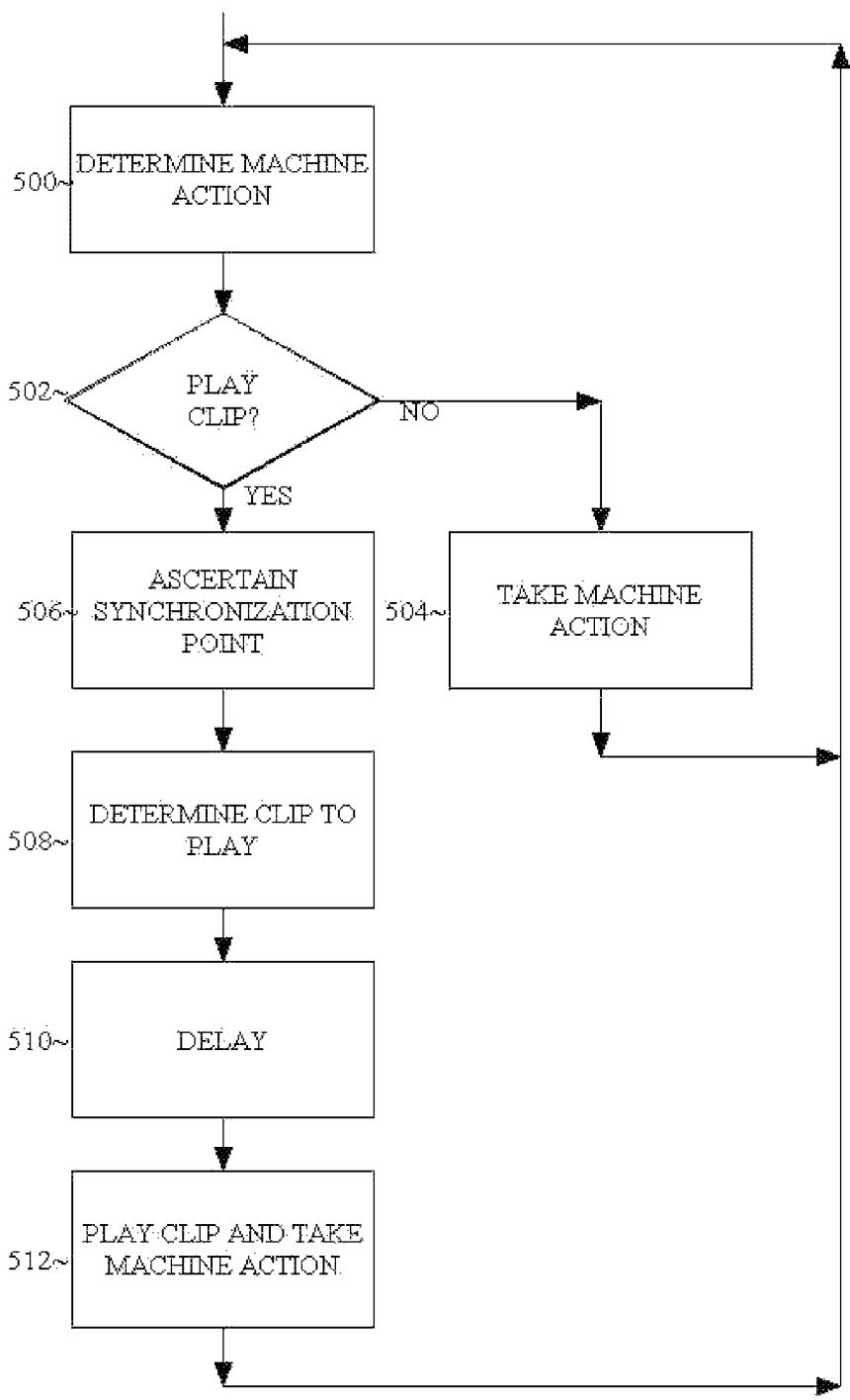
FIG. 5 is a flowchart illustrating a method of implementing a collaborative harmony, according to an embodiment.

FIG. 5 is a flowchart illustrating a method of implementing a collaborative harmony, according to an embodiment.

The method can begin with operation 500, which determines an action on a slot machine. The action can be, for example, remain idle, spin reels, stop a reel, pay an award, transition to a bonus round, cash out, etc. This can be done as known in the art. In an embodiment, the determination of a particular action on one machine in the network may trigger other actions for other machines in the network. For example, the determination that the player of a particular machine has won a progressive jackpot may determine that all other machines in the network should simultaneously flash a message on-screen and play a trumpet-fanfare sound. Once determined, these other actions on other machines (whether gaming machines or external devices) can follow the same process as set forth in FIG. 5 herein.

From operation 500, the method can proceed to operation 502, which determines whether to play a clip. This determination can be based on the action in operation 500 and the configuration, for example, an idle machine may or may not play a clip depending on the configuration. Certain actions typically have clips associated with them, such as spin reels, win an award, etc.

If operation 502 determines that no clip is to be played, then the method proceeds to operation 504, which takes the machine action.

If operation 502 determines to play a clip, then the method proceeds to operation 506, which ascertains the synchronization point. The synchronization point is not actually set by the individual machine. It can be ascertained by a number of methods, for example, receiving a broadcast from a central server periodically. It can also be computed by receiving a broadcast from the central server at start up, and then the synchronization point can be determined locally for the remainder of the period of use (e.g., one day). For example, upon startup, the server may tell the particular slot machine that the synchronization point is 0.5 seconds (out of a possible 5 seconds, which then starts back at 0). The slot machine can run a local timer to count up to 5 seconds from the initially transmitted synchronization point, and then start back at 0. However, the synchronization point is actually set by the network and the individual machine can ascertain the synchronization point but cannot change it.

From operation 506, the method proceeds to operation 508, which determines the particular clip for the slot individual slot machine to play. This can be determined as described herein. The determination can be based on several factors, such as the type of machine, the machine action, the synchronization point, etc.

From operation 508, the method can proceed to operation 510 which can delay before the clip is played in order to maintain the collaborative harmony and so that the clip is not "out of time." Operation 510 can be optional in that it is not performed in one embodiment. In another embodiment, operation 510 will always be performed. In a further embodiment, operation 510 may or not be performed, depending on current conditions (e.g., synchronization point, machine action, etc.)

The delay can come in numerous forms. For example, the clip that was determined to be played in operation 508 can simply be delayed before playing from the start so as to remain in sync with the other audio being played. For example, if the collaborative harmony's beat starts anew every second, then each clip should start to play when the synchronization point begins a new second so as to not be out of time.

In addition, the machine action itself can either be delayed or prolonged, for example, if reels are spinning and the machine action is making an award, the reels can be spun longer (i.e. delayed) in order to synchronize the award clip to be played. Slot machines know whether an award will be paid even before the reels are actually spun. In a further embodiment, the spinning may actually be shortened (thus, a negative delay) in order to synchronize.

Prolonging the machine action can be combined with delaying the playing of the clip. For example, if the maximum delay needed is one second, then the machine action (e.g., payout, reels spinning, etc.) can be prolonged a half second and then the clip can start playing a half second later. If the delay needed is D, then this can be split (evenly or unevenly) between these two operations, in order to mask the delay to the player so that the player does not even notice any delay in audio playing from the machine.

From operation 510, the method proceeds to operation 512, which plays the audio clip and takes the machine action. For example, if the reels are spinning, the reels will spin while simultaneously playing the determined spinning clip.

A further example of one embodiment of the inventive concept will be presented. In this example, the audio tempo is one beat per second. When the player presses spin on a three reel game, each reel resolution can be a beat—that is, one reel resolves every second. However, because the player may not press spin exactly on the beat, a first way to handle this would be to delay the spinning of the reels until the next beat, although the player may perceive a slight delay. Alternatively, the spin can begin immediately but the intended audio effect would be delayed until the next beat, or an intermediate sound may be generated to fill the time between when the spin starts and when the intended audio effect can be played with musicality. The intermediate sound may be dynamically adjusted, for example, based on pitch or timbre, to sound more consonant with the overall acoustic surroundings. For example, if the sound clips being played by surrounding machines formed a G7 chord (as determined by where the synchronization point is in the clips), the generated intermediate sound may also be a note (or notes) in the G7 chord. Normally a "game play initiation" sound is a single sound clip, but in this embodiment, it can be adjusted to fit in with the larger musical surroundings based on the synchronization point (e.g. at the start of the clip, the initiation sound can be a C major chord, but near the end of the clip, it would be a G7 chord). After the reels are spinning, the reel resolution can be delayed or modified as described herein to ensure that the reels resolve on the beat (in this example, every second on the second). This is shown in Table V:

TABLE V

| Elapsed Time | Event |
| --- | --- |
| 0.50 sec | Player presses play; reels begin spinning, no sound generated (or intermediate sound generated) |
| 1.00 sec | Reel spin sound begins |
| 2.00 sec | First reel resolves; play first reel resolution sound |
| 3.00 sec | Second reel resolves; play second reel resolution sound |
| 4.00 sec | Third reel resolves; play third reel resolution sound |

Instead of delaying the reel-spin audio when the player first spins, in another embodiment, a "pre-clip" audio is played immediately upon the spin at a low volume (and the volume may optionally be "faded up" over time). In this manner, the pre-clip audio would primarily be heard by the player at the machine but not be widely heard on the gaming floor. The pre-clip audio can be a simple beep, tone, or other sound associated with a reel spin so that the player receives an auditory indication of the reels spinning. Upon reaching the next full beat (on the second in the current example), then the appropriate actual clip can be played using a louder volume that would be heard on the gaming floor. The sound of the pre-clip audio can fade into the actual clip when it is played, minimizing the clash between the pre-clip audio and the actual clip, or it may be cut off (muted) altogether. The pre-clip audio is not necessarily "in sync" with the rhythm or harmony of the casino floor area, which is why it is played softer than the actual clip itself.

In a further embodiment, different sets of speakers can be associated with each machine, such as local speakers and broadcast speakers. Local speakers can be small and directed towards the player, while broadcast speakers can be larger and directed towards the floor, ceiling, or broader environment. Local speakers would be used for sounds (such as game-event-dependent sounds which may not contribute to the larger collaborative harmony but which may nevertheless be desired for the gaming experience) that are intended to be heard by the player only ("local sounds"), while the broadcast speakers would be used for sounds that are intended to be heard on the casino floor ("harmony sounds"). Thus, sounds which would not be in sync or would otherwise be dissonant with the overall background soundtrack can be played using the local speakers, while sound clips played in sync and/or which contribute to the collaborative harmony can be played on the broadcast speakers. While both sets of speakers can be used for all sounds, the volume for the local speakers would be louder than the volume for the broadcast speakers for local sounds, while the volume for the broadcast speakers would be louder than the volume for the local speakers for harmony sounds.

Figure 6:
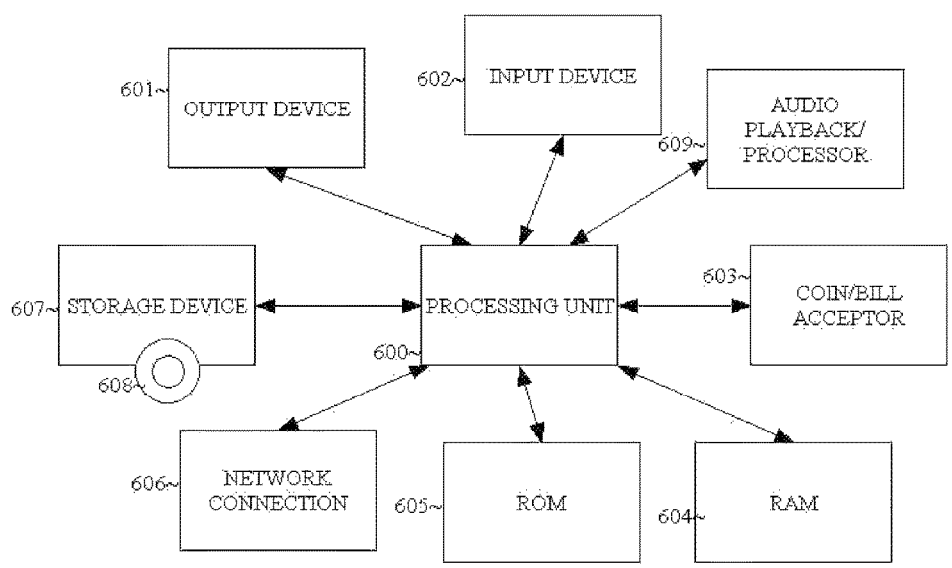
FIG. 6 is a block diagram illustrating hardware that can be used to implement an individual slot (or gaming) machine, according to an embodiment.

FIG. 6 is a block diagram illustrating hardware that can be used to implement an individual slot (or gaming) machine, according to an embodiment.

A processing unit 600 can be a microprocessor and any type of associated components (e.g., cache, bus, etc.) The microprocessor is connected (directly or indirectly) to an output device 601 (e.g., touchscreen, speakers, reels, CRT, etc.) an input device 602 (e.g., touchscreen, keyboard, mouse, etc.), a coin/bill acceptor 603 (which can also accept cashless tickets or electronically encoded payments cards), a RAM 604, a ROM 605, a network connection 606 (connecting the slot machine to any type of network such as a LAN, WAN, wifi, etc.), and a storage device 607 which can store programs and/or data to implement any of the methods described herein on a storage device 608. The processing unit 600 can also be attached to an audio playback/processor 609, which can process and play the audio clips described herein on a speaker attached to the machine.

Additionally, the methods and embodiments of this invention may be embodied in a remote gaming system, such as an Internet casino website involving a computer server with a processor running software to implement the methods herein, connected to a network (such as the Internet), which is in turn connected to a remote personal computer consisting of a processor, visual display, and at least one input device such as a mouse, keyboard, or touchscreen. Alternative embodiments include server-based gaming systems, comprising electronic gaming terminals in gaming locations which are connected via network to a central server for various aspects of functionality, including game software downloads and/or central-determinant random outcome generation. These are known in the art as Server-Based Gaming Systems and System-Supported Gaming Systems (SBGS and SSGS). Alternative embodiments include a mobile client device, such as a smartphone or tablet computer, connected wirelessly to a gaming server, wherein the mobile client device accesses the gaming server and receives gaming outcomes in a similar fashion as an Internet casino. In several of these configurations, the processor which actually executes the game play functionality is physically separate from the display device which displays the game play results to the player, as well as the input device(s) with which the player interacts. In many such configurations, there is no coin/bill acceptor present in the system; instead, currency is electronically transferred to an account maintained by a central server.

In another embodiment, machines that are idle can cooperatively play music or other media in an attract mode to bring players to the machines. "Attract modes" are known in the art, but only on an individual machine basis. In an embodiment, idle EGMs on a network may synchronize playback of audio or visual assets to attract casino patrons' attention. The screens of a bank of slot machines may play a synchronized video or animation across multiple machines (with appropriate sounds). For example, if machines are situated side by side (e.g., machines 202, 203, 204, 205), with machine 202 on the left, then a synchronized media distribution during idle time may be an animation of a football quarterback throwing a pass from machine 202, "through" machines 203 and 204, to a wide receiver catching the football on machine 205. Or a racecar driving from the screen of machine 202 to machine 203 to machine 204 to machine 205 (or vice versa). Such animations could occur on the main screen of video machines, or only on a bonus second screen (e.g. "top box"), or both. Further, while attract modes are typically not run simultaneously as gaming activity on a machine, this invention contemplates that the higher-mounted second screen found on most video slot machines could be used as an output display for synchronized multimedia attractions even when the machines are in use (except during bonus round play). Further, a synchronized idle playback of audio or video assets can act as an "entice" mode when an idle machine detects that a patron is at the machine but is not playing (for example, they are looking at the paytable, as determined by using a proximity sensor, camera or other detection mechanism). Upon detecting such a patron, an "entice" mode (which is more targeted than a randomly-timed "attract" mode) may be triggered. For example, if a player sits down at a machine and reviews the game rules without depositing any money, the slot machine can detect this and can coordinate the playback of an enticement audio and video, between the machine in question and several other nearby machines (preferably that are idle as well). The "entice" mode can encourage the player to deposit funds whereas they may not have otherwise, leading to increased casino revenue. For example, an idle machine in a bank of machines may detect the passing-by of a potential player and trigger an audio clip (in sync with the other audio) which contains exciting music and a voiceover which says "Hey, have a seat! We're having fun here!" Such an entice mode can also be used in a standalone, non-networked fashion, where only the machine in question responds to a potential player.

While the majority of examples herein have used short sound clips as illustrative examples, other embodiments of the present inventive concept include the use of larger audio works, such as pop songs, jazz songs, rock-n-roll songs, or symphonic works. Such media may be appropriately divided into parts and distributed across multiple machines in a network as described herein. Moreover, players of gaming machines may be afforded the opportunity to select which song will be heard, similar to a jukebox in a diner. A player at a gaming machine may, for example, select Glenn Miller's iconic "In The Mood". At some point thereafter (perhaps after the current song finishes playing), the gaming machines played by patrons in the area adjacent to that player will all have various musical parts from "In The Mood" distributed to their machines, appropriately coded and synchronized to game play states as described herein (such as spinning reels, entering bonus rounds, winning awards). In one method, to maintain a minimum level of audio—because players would likely desire to hear the song being played at some minimum level—some or all of the various parts of the song may be played in the background by various machines. When a gaming machine enters a particular game state, the associated portion of the song (synchronized to the beat) may be played back at a much louder level. Alternatively, or additionally, extra sounds (e.g. drum hits, horn riffs) may be played over the top of the background to emphasize certain game states such as winning a prize. Such jukebox functionality can be added to any method described herein to allow players a measure of control over the audio environment of their machine and surrounding machines. Shared, user-selected audio may be distributed over a set of similar machines (e.g. all with the same theme) or may be distributed across a set of dissimilar machines (including but not limited to different older 3-reel games which do not have a particular thematic element, and which are therefore amenable to sharing a synchronized audio soundtrack). Beneficially, shared, user-selected audio may encourage patrons to stay longer at their respective gaming machines so they can hear their selected songs.

It is also noted that any and/or all of the above embodiments, configurations, variations of the present invention described above can mixed and matched and used in any combination with one another. This also includes any prior document incorporated by reference, and any feature described herein can also be applied to any such documents. Any claim herein can be combined with any others (unless the results are nonsensical).

Moreover, any description of a component or embodiment herein also includes hardware, software, and configurations which already exist in the prior art and may be necessary to the operation of such component(s) or embodiment(s).

Further, the operations described herein can be performed in any sensible order. Any operations not required for proper operation can be optional. Further, all methods described herein can also be stored on a computer readable storage to control a computer.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A gaming machine method, comprising:
providing a first gaming machine in an area of a casino floor, the first gaming machine having at least two game states;
providing a second gaming machine in the area of the casino floor, the second gaming machine having at least two game states;
providing a musical track, the musical track of duration X, comprising a first musical part of duration X and a second musical part of duration X, the first musical part being different from the second musical part;
wherein the first gaming machine enters a first gaming machine first state at time T1;
wherein the second gaming machine enters a second gaming machine first state at time T2, wherein T2 is later than T1;
wherein the first gaming machine begins playback of the first musical part at a first start time S1, wherein S1 is no earlier than T1, and wherein during playback of the first musical part, the first gaming machine does not play the second musical part, wherein the first musical part played by the first gaming machine is in response to an event occurring on the first gaming machine; and
wherein the second gaming machine begins playback of the second musical part at a first start time S2, wherein S2 is no earlier than T2, and wherein during playback of the second musical part, the second gaming machine does not play the first musical part, and wherein the playback of the second musical part starts at an offset of O2 into the second musical part, wherein the playback of the second musical part starting at the offset of O2 results in synchronized playback of the first musical part and the second musical part to listeners near the area of the casino floor,
wherein the second musical part played by the second gaming machine is in response to a spin being initiated on the second gaming machine.

2. The gaming machine method of claim 1, further comprising:
  providing a synchronization beat at a beat rate, wherein an elapsed time between consecutive beats in the beat rate is D;
  wherein S1 is between T1 and (T1+D), S1 being determined using the synchronization beat;
  wherein S2 is between T2 and (T2+D), S2 being determined using the synchronization beat;
  wherein O2 is approximately equal to (S2−S1) modulo X.

3. The gaming machine method of claim 2,
  wherein the first gaming machine enters a first gaming machine second state at time T3, wherein T3 is later than S1;
  wherein the first gaming machine ceases playback of the first musical part at a first stop time S3, wherein S3 is between T3 and (T3+D), S3 being determined using the synchronization beat;
  wherein the second gaming machine enters a second gaming machine second state at time T4, wherein T4 is later than S2;
  wherein the first gaming machine ceases playback of the second musical part at a first stop time S4, wherein S4 is between T4 and (T4+D), S4 being determined using the synchronization beat.

4. The gaming machine method of claim 1,
  wherein the first gaming machine enters a first gaming machine second state at time T3, wherein T3 is later than S1;
  wherein the first gaming machine ceases playback of the first musical part at a first stop time S3, wherein S3 is no earlier than T3;
  wherein the second gaming machine enters a second gaming machine second state at time T4, wherein T4 is later than S2;
  wherein the first gaming machine ceases playback of the second musical part at a first stop time S4, wherein S4 is no earlier than T4.

5. The gaming machine method of claim 1,
  wherein the first gaming machine enters a first gaming machine second state at time T3, wherein T3 is later than S1;
  wherein the first gaming machine ceases playback of the first musical part at a first stop time S3, wherein S3 is no earlier than (S1+X);
  wherein the second gaming machine enters a second gaming machine second state at time T4, wherein T4 is later than S2;
  wherein the first gaming machine ceases playback of the second musical part at a first stop time S4, wherein S4 is no earlier than (S2+X).

6. The gaming machine method of claim 1,
  wherein the musical track further comprises a third musical part of duration X;
  wherein the first gaming machine enters a first gaming machine second state at time T3, wherein T3 is later than S1;
  wherein the first gaming machine begins playback of the third musical part at a second start time S5, wherein S5 is no earlier than T3.

7. The gaming machine method of claim 6,
  wherein the first gaming machine ceases playback of the first musical part at a first stop time S3, wherein S3 is no later than S5.

8. The gaming machine method of claim 6,
  wherein the first gaming machine continues playback of the first musical part until a first stop time S3, wherein S3 is after S5.

9. The gaming machine method as recited in claim 1, wherein the first gaming machine is operating in an attract mode and the second gaming machine is operating in a play mode.

10. A system for generating a collaborative harmony among a plurality of gaming machines, the system comprising:
  a first gaming machine in an area of a casino floor comprising an input device, a processor, and a memory device;
  a second gaming machine in the area of the casino floor comprising an input device, a processor, and a memory device;
  a timing signal comprising a plurality of periodically recurring silent beats, the timing signal synchronized between the first gaming machine and the second gaming machine; and
  wherein the first gaming machine is configured to execute instructions stored in a memory device to perform the following operations:
  receiving a game play input from an input device at time T1;
  entering a first game play state at time T2, wherein T2 is no earlier than T1; and
  beginning to output audio associated with the first game play state at time T3, wherein T3 is no earlier than T2, wherein T3 coincides with one of the silent beats.

11. The system of claim 10, wherein the first gaming machine is further configured to perform:
  upon receiving the game play initiation, the first game play state occurs immediately such that T1=T2.

12. The system of claim 10, wherein the first gaming machine is further configured to perform:
  upon receiving the game play initiation, the first game play state is delayed such that T2 coincides with one of the silent beats and T2 is later than T1.

13. The system of claim 10,
  wherein the first gaming machine is a slot machine with a plurality of reels;
  wherein the game play input is a request to initiate game play;
  wherein the first game play state is that the plurality of reels of the slot machine are spinning;
  wherein the audio associated with the first game play state is a reel spinning sound.

14. The system of claim 13, wherein the first gaming machine is further configured to perform:
  upon receiving the request to initiate game play, the plurality of reels of the slot machine begin spinning immediately.

15. The system of claim 13, wherein the first gaming machine is further configured to perform:
  upon receiving the request to initiate game play, the plurality of reels of the slot machine begin spinning on one of the silent beats.

16. The system of claim 15, wherein the first gaming machine is further configured to perform:
  the plurality of reels of the slot machine begin spinning and the beginning to output the reel spinning sound occur simultaneously.

17. The system of claim 13, wherein the first gaming machine is further configured to:

enter a second game play state at time T4, wherein T4 is no earlier than T2;

begin to output audio associated with the second game play state at time T5, wherein T5 is no earlier than T4, wherein T5 coincides with one of the silent beats; and begin to display the second game play state at time T5.

18. The system of claim 10, wherein the first gaming machine is further configured to perform:

at time T1, outputting audio associated with the game play input, wherein said audio is selected from a plurality of audio for game play input.

19. The system of claim 18, wherein the first gaming machine is further configured such that a volume of the audio associated with the game play input is lower than a volume of the audio associated with the first game play state.

20. The system of claim 18, wherein the first gaming machine is further configured such that the audio associated with the game play input is outputted primarily via local speakers, wherein the audio associated with the first game play state is outputted primarily via broadcast speakers.

* * * * *